(12) United States Patent
Auxerre

(10) Patent No.: US 6,913,051 B2
(45) Date of Patent: Jul. 5, 2005

(54) TIRE WITH DUAL ANCHORAGE CARCASS PLY

(75) Inventor: Pascal Auxerre, Royat (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 2 days.

(21) Appl. No.: 10/705,846

(22) Filed: Nov. 13, 2003

(65) Prior Publication Data

US 2004/0154720 A1 Aug. 12, 2004

Related U.S. Application Data

(63) Continuation of application No. PCT/EP02/05479, filed on May 17, 2002.

(30) Foreign Application Priority Data

May 21, 2001 (FR) .............................................. 01 07199

(51) Int. Cl.$^7$ ................................................ B60C 3/00
(52) U.S. Cl. ........................ 152/454; 152/539; 152/543
(58) Field of Search ................................ 152/539, 542, 152/544, 545, 546, 547, 550, 555, 379.5, 380, 381.3, 381.4, 454, 540, 543, 552

(56) References Cited

U.S. PATENT DOCUMENTS

| | | | | |
|---|---|---|---|---|
| 4,057,092 A | | 11/1977 | Tracy | |
| 4,061,172 A | * | 12/1977 | Yoshida et al. | 152/379.3 |
| 4,365,659 A | * | 12/1982 | Yoshida et al. | 152/510 |
| 4,373,567 A | * | 2/1983 | Declercq | 152/405 |
| 4,601,172 A | * | 7/1986 | Stotts | 60/521 |
| 5,145,536 A | * | 9/1992 | Noma et al. | 152/209.16 |
| 5,232,033 A | * | 8/1993 | Durif | 152/381.4 |
| 5,323,830 A | * | 6/1994 | Diernaz | 152/544 |
| 5,743,976 A | * | 4/1998 | Pena et al. | 152/543 |
| 6,463,975 B1 | * | 10/2002 | Auxerre | 152/454 |
| 6,623,584 B2 | * | 9/2003 | Caretta | 156/133 |

FOREIGN PATENT DOCUMENTS

| | | |
|---|---|---|
| EP | 0 582 196 A1 | 2/1994 |
| WO | 99 64225 A | 12/1999 |

* cited by examiner

Primary Examiner—Frantz F. Jules
(74) Attorney, Agent, or Firm—Burns, Doane, Swecker & Mathis, L.L.P.

(57) ABSTRACT

Tire, comprising at least one carcass-type reinforcement structure extending circumferentially from the bead to the sidewall and a crown reinforcement, each of the beads further comprising a main anchoring zone for supporting the reinforcement structure, the tire comprising a rim protector provided by a rubber projection extending axially outwardly relative to the sidewall and comprising at least one secondary anchoring zone comprising a plurality of circumferential cord windings, the windings cooperating with an adjacent portion of a secondary reinforcement structure via a rubber anchoring mix. Since anchoring is distributed between the bead and the rim protector, new architectural or design possibilities are opened up, for example permitting the use of the restricted space of the bead in an optimum manner. Thus, for example, the presence of the secondary anchoring zone at the rim protector helps greatly to improve the behavior of the tires, in particular resistance to drift.

14 Claims, 4 Drawing Sheets

TIRE WITH DUAL ANCHORAGE CARCASS PLY

This application is a continuation of international PCT application Ser. No. PCT/EP02/05479, filed May 17, 2002, which was published in English as WO 02/094584 A1 on Nov. 28, 2002, and which is incorporated by reference.

BACKGROUND

The present invention relates to tires. More particularly it relates to a tire having a rim protector acting as an anchorage point for at least one carcass-type reinforcement structure.

The reinforcement of tire carcasses is currently formed by one or more plies (conventionally termed "carcass plies" from the manufacturing process in the form of semi-finished products as plies), provided with cord reinforcements which are usually radial. The anchoring or support of these plies or reinforcements is effected conventionally by turning up a portion of the ply around a bead wire disposed in the bead of the tire.

Furthermore, there are currently tires which do not have the traditional turning-up of the carcass ply around a bead wire, nor even a bead wire in the traditional sense of this element. For example, the specification EP 0 582 196 describes a means of contriving a carcass-type reinforcement structure in the beads, by disposing adjacent to the reinforcement structure circumferential filaments, the whole being embedded in a rubber anchoring or bonding mix, preferably with a high modulus of elasticity. Various arrangements are proposed in this specification. The specification further refers to tires manufactured without the aid of semi-finished products in the form of plies. For example, the cords of the various reinforcement structures are applied directly to the adjacent layers of rubber mixes, the whole being applied by successive layers on to a core having a form whereby it is possible to obtain directly a profile related to the final profile of the tire being manufactured. Thus, in this case, rather than "carcass plies" in the conventional sense, more specifically "carcass-type reinforcements" are found.

The anchoring of the reinforcement structure or carcass ply (if the tire is assembled with various semi-finished products, including a carcass ply) is of particular importance in order to ensure durability of the tire. The realisation of a durable and reliable anchorage often involves using a large area of the bead and using high-quality materials, which is therefore costly. The presence of cord windings or a bead wire further implies a large mass.

Furthermore, the specifications of motor vehicle manufacturers on the one hand and standards in force in the various countries on the other mean that, for a tire of a given dimension, one finds a rim also of given dimensions. These technical standards mean that it is more difficult to get away from the usual compromise of the conventional anchoring found in tires of known types. The manufacturers of tires therefore generally use other architectural elements than beads and anchorings in order to optimise the features of the product.

SUMMARY OF INVENTION

Thus the invention proposes a tire comprising at least one carcass-type reinforcement structure anchored on each side of the tire in a bead whose base is intended to be mounted on a rim seat, each bead extending radially outwardly by a sidewall, the sidewalls radially outwardly joining a tread, the carcass-type reinforcement structure extending circumferentially from the bead to the sidewall, and a crown reinforcement, each of the beads further comprising a main anchoring zone for supporting the reinforcement structure, the tire comprising, in a position that is radially outward from the anchoring zone, a rim protector provided with a rubber projection extending axially outwardly from the sidewall and comprising at least one secondary anchoring zone comprising a plurality of circumferential cord windings, the windings cooperating with an adjacent portion of a secondary reinforcement structure via a rubber anchoring mix.

As its name indicates, the rim protector provides a bearing point extending axially beyond the rim: in the case of impact or friction against an attacking element, e.g. a pavement, the rim protector prevents contact with the rim. In this case, slight deterioration of the rim protector, such as a scratch or graze which is generally barely visible and above all has no effect on the lifespan of the tire, is preferred to deterioration of the rim, which would often be more easily visible.

Furthermore, the presence of the secondary anchoring zone in the rim protector helps to lend rigidity thereto in order to improve its strength and durability.

Furthermore, the use of the rim protector in order to provide therein a secondary anchoring zone makes it possible to optimise the use of the rim protector as such. Thus there is benefit to be gained from the available space in the rim protector, freeing the bead, which thus benefits from a larger available volume for disposing the various constituent elements. Since anchoring is distributed between the bead and the rim protector, new architectural or design possibilities are opened up, for example permitting the use of the restricted space of the bead in an optimum manner. Thus, for example, the presence of the secondary anchoring zone at the rim protector helps greatly to improve the behaviour of the tires, in particular resistance to drift.

Furthermore, the use of alignments or windings of cord in cooperation with a rubber anchoring mix, preferably with a high modulus of elasticity, and preferably in cooperation also with an adjacent portion of reinforcement structure, helps to separate rigidities. Therefore, it is thus possible to increase the transverse rigidity whilst keeping the radial rigidity unchanged.

The secondary reinforcement structure is preferably a structure portion extending from the rim protector to a portion of the sidewall located radially outwardly. According to a preferred embodiment of the invention, the secondary structure cooperates with the first reinforcement structure.

According to a first advantageous embodiment of the invention, the secondary reinforcement structure extends from one sidewall of the tire to the other along a meridian path substantially adjacent to the first carcass-type reinforcement structure. The tire therefore comprises two reinforcement structures.

In a second advantageous embodiment of the invention, the secondary reinforcement structure consists of a plurality of sections of carcass-type reinforcement structure of limited circumferential length, whose axial position is apart from the two other adjacent circumferential sections from the sidewall to the rim protector. These may be portions of the main reinforcement structure of which certain portions are uncoupled starting from a certain position along the sidewall, which is radially exterior to the rim protector, in order to extend radially inwardly and axially outwardly from the point of separation towards the secondary anchoring zone. The tire is thus formed of a circumferential alternation between uncoupled zones on one hand, and non-uncoupled or single-structure zones up to their anchoring in the bead on the other.

The main anchoring zone may advantageously be realised in particular according to two main types of structure: first of all, it comprises a plurality of circumferential windings cooperating with the adjacent reinforcement structure portion via a rubber anchoring mix. According to the second type, it comprises a bead wire about which a carcass-type structure portion is at least partially wound or turned.

According to an advantageous embodiment of the invention, the rubber mix of the secondary anchoring zone is similar to that of the main anchoring zone. The conception and manufacture of the tire are therefore simplified. Homogeneity of certain properties is also obtained.

According to an advantageous example, at least one of the anchoring zones comprises or is generally formed of a rubber mix with a high modulus of elasticity. This mix may for example be provided on only one side of the cord alignments. A high modulus helps to effect optimum anchoring. By way of non-limiting example, the modulus of elasticity of such a mix may reach or even exceed 15 Mpa, and even in some cases reach or exceed 40 Mpa.

According to a further advantageous embodiment the rubber anchoring mix extends along the reinforcement structure from the primary anchoring zone to the secondary anchoring zone.

The cord alignments of the second zone are advantageously of a similar kind to those of the primary zone.

According to an advantageous modification, the secondary zone comprises plural types of cord. These may be metal, textile or of a hybrid type.

Whether the main or secondary anchoring zone is involved, a winding or alignment may comprise one single or plural cords. The cord alignments may also be arranged and manufactured in various ways. For example, one alignment may be advantageously formed of a single cord wound (substantially at zero degrees) in a spiral in plural turns, preferably from the smallest diameter to the largest. It may also be formed of a plurality of concentric cords placed one inside another, so that rings of progressively increasing diameters are superimposed one on another. It is not necessary to add a rubber mix in order to effect impregnation of the cord or circumferential windings of cord. The cords may also be discontinuous along the circumference.

According to another advantageous example, some cords are of a substantially elastic type. The elastic cords are arranged preferably in the radially outer portion of the mechanical bonding means. This type of cord affords behaviour which is adapted to possible compression zones tending to form during operation, e.g. when the sidewall is pushed inwards. The probability of formation of such zones is higher the further one goes from the bead, radially outwardly.

By using different types of cord having different properties or materials, each has a very specific place whereby it is possible to optimise the features of the bottom zone of the tire.

Some or all of the cords of the alignment are advantageously non-metal, preferably of a textile type, such as cords with a base of aramide, aromatic polyester, or other types of cord with lower moduli of elasticity such as cords with a base of PET, nylon, rayon, etc. These cords advantageously have a lower modulus of elasticity than that of the metal cords of the anchoring zone.

BRIEF DESCRIPTION OF DRAWINGS

All the details of realisation are given in the following description with reference to FIGS. 1 to 3, which show.

DETAILED DESCRIPTION OF PREFERRED EMBODIMENTS

For reference, "radially upward" or "radially upper" or "radially outward" here means towards the larger radii.

In the present specification, the term "cord" designates very generally both single filaments and multiple filaments or assemblies such as cables, yarns or even any other type of equivalent assembly, whatever the material and processing of these cords, for example surface treatment or coating or pre-coating with glue to promote adhesion to the rubber.

A carcass-type reinforcement structure will be known as radial since its cords are arranged at 90°, but also, according to current terminology, at an angle close to 90°.

By "features of the cord", its dimensions, composition, mechanical properties (in particular its modulus), chemical properties etc. are intended.

Figure 1:
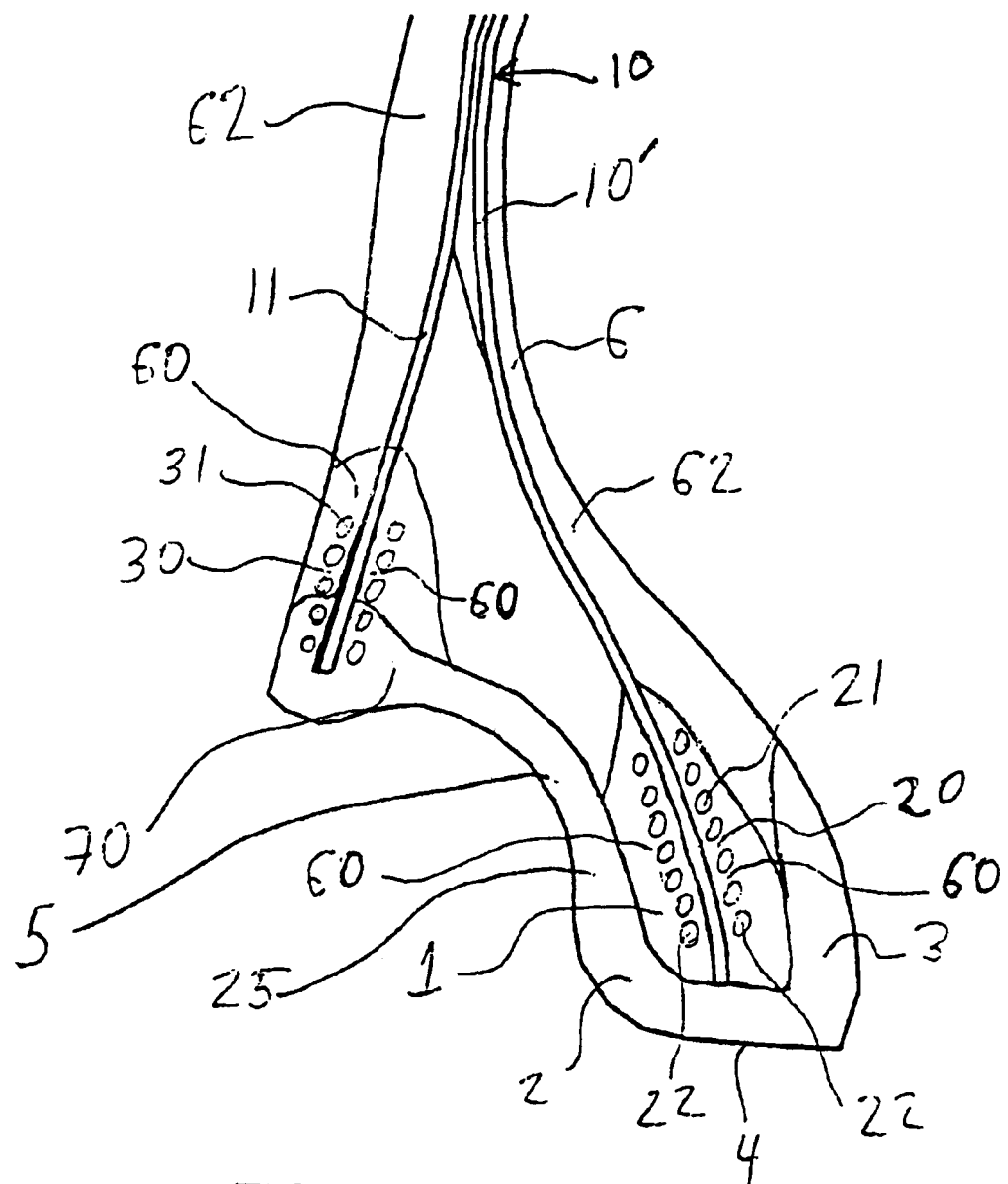
FIG. 1, a radial section showing essentially a sidewall and a bead of a first embodiment of a tire according to the invention.
Figure 2:
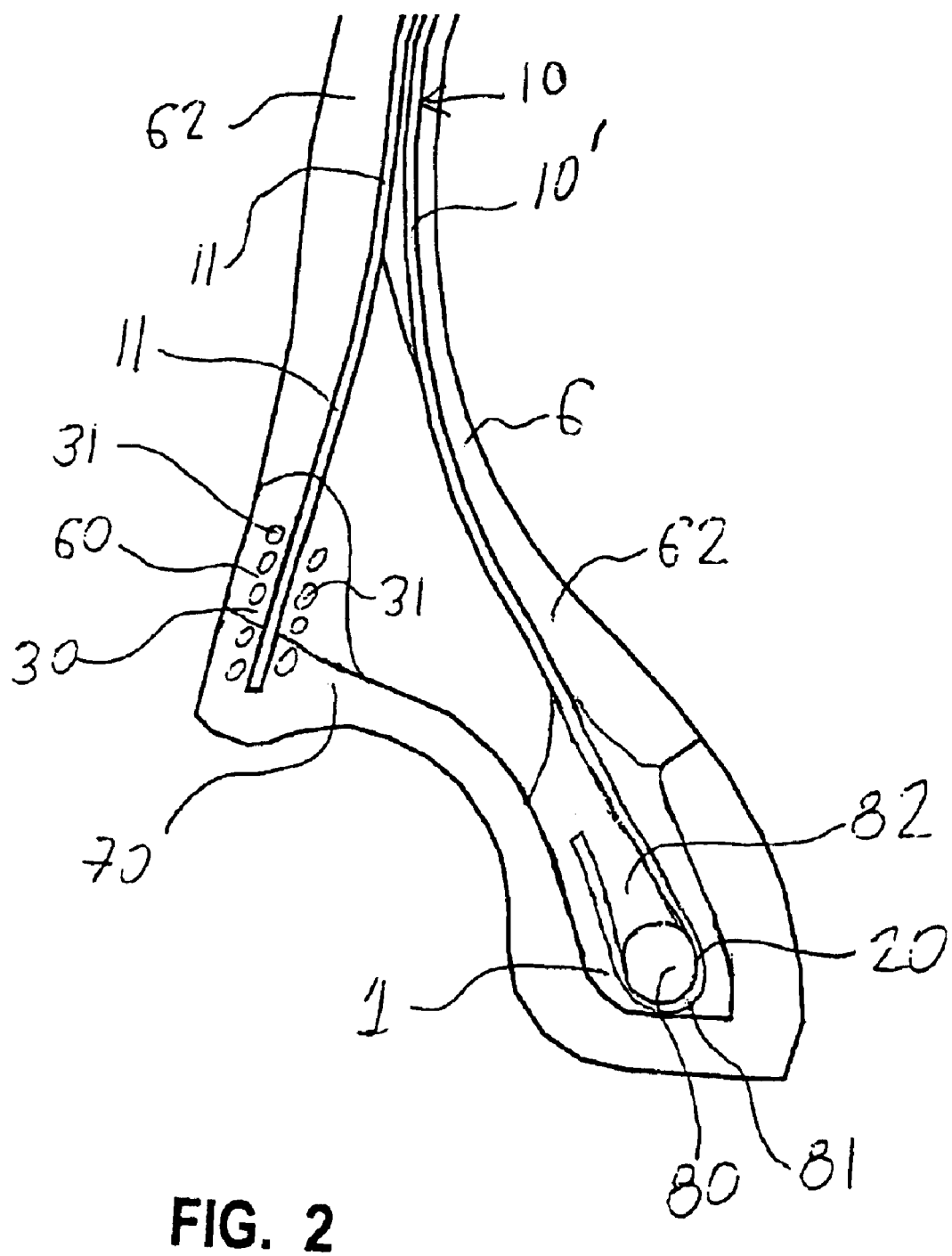
FIG. 2, a radial section showing essentially a sidewall and a bead of a second embodiment of a tire according to the invention.

FIG. 1 shows the lower zone, in particular the bead 1 of a first embodiment of the tire according to the invention. The bead 1 has an axially outer portion 2 provided and shaped so as to be placed against the flange of a rim. The upper portion, or radially outer part of the portion 2 forms a portion 5 adapted to the hook of the rim. This portion is often curved axially outwards, as is shown in FIGS. 1 and 2. The portion 2 ends radially and axially on the inside with a bead seat 4 adapted to be placed against a rim seat. The bead also has an axially inner portion 3 extending substantially radially from the seat 4 to the sidewall 6. A rubber sidewall mix 62, advantageously of a lower modulus than the anchoring mix 60, is provided along the sidewalls.

A zone 25 of protective mix, whose modulus of elasticity is lower than that of the mix of the anchoring zone, is advantageously provided along the outer contour of the bead, e.g. in order to promote contact with the rim and to protect the anchoring zone.

The tire further comprises a carcass-type reinforcement structure 10 comprised of a main reinforcement structure 10' and a secondary reinforcement structure 11. Both reinforcement structures 10' 11 are provided with reinforcements advantageously configured in a substantially radial arrangement. This structure can be contrived to be continuous from one bead to the other, passing through the sidewalls and the crown of the tire, or again it may comprise two or more parts arranged for example along the sidewalls without covering the entire crown.

In order to position the reinforcement cords as precisely as possible, it is most advantageous to pre-fabricate the tire on a rigid support, e.g. a rigid core imposing on the tire the shape of its inner cavity. All the components of the tire are applied to this core in the order required by the final architecture, without the need to modify the tire profile during fabrication.

Circumferential cords 21, preferably arranged in the form of batches 22, form an arrangement of anchoring cords, provided in each of the beads. These cords are preferably metal, and possibly brass-coated. In each batch, the cords are advantageously substantially concentric and superimposed.

In order to effect perfect anchoring of the reinforcement structure, a composite layered bead is formed. Inside the bead 1, between the cord alignments of the reinforcement structure, cords 21 are provided which are oriented circumferentially. These are disposed in a batch 22 as in the Figures, or in plural adjacent batches or in bundles, or in any other judicious arrangement, according to the type of tire and/or the features desired.

The radially inner end portions of the main reinforcement structure 10' cooperate with the cord windings. Thus anchoring of these portions in the beads is obtained. In order to promote this anchoring, the space between the circumferential cords and the reinforcement structure is occupied by a rubber bonding or anchoring mix 60. The use of plural mixes having different features defining different zones may also be provided, the combinations of mixes and resulting arrangements being virtually unlimited. It is however advantageous to provide the presence of a mix with a high modulus of elasticity in the intersection zone between the cord arrangement and the reinforcement structure, thus forming a main anchoring zone 20. By way of non-limiting example, the modulus of elasticity of such a mix may reach or even exceed 15 Mpa, and even in some cases reach or exceed 40 Mpa.

The arrangements of circumferential cords may be contrived and manufactured in various ways. For example, a batch may advantageously consist of a single cord wound (substantially at zero degrees) in a spiral in plural radially spaced turns, preferably from the smallest diameter to the largest. A batch may also be formed of a plurality of concentric cords placed one inside another, so that radially spaced rings of progressively increasing diameters are superimposed one on another. It is not necessary to add a rubber mix in order to effect impregnation of the cord reinforcement or circumferential windings of cord.

In the example in FIG. 1, on each side of the reinforcement structure the bead comprises an arrangement of anchoring cords formed of juxtaposed batches of cords disposed on either side of the main reinforcement structure 10'. They are advantageously disposed immediately next to the reinforcement structural. The structure shown in FIG. 1 is particularly simplified and simple to realise. Some stresses of the reinforcement structure are transmitted to the windings at zero degrees via the mix 60.

The tire further comprises a rim protector 70. This consists of a circumferential rubber strip which is axially exterior to the sidewall and is located substantially radially outward from the bead 1. This rim protector acts as a protection by preventing any contact between the rim disposed on this wheel and any external object or obstacle capable of damaging the rim. This is a highly useful element for vehicles equipped with rims composed of alloy, such as aluminium. They furthermore greatly improve the appearance of the vehicle.

The tire further comprises a secondary anchoring zone 30. This zone is intended to cooperate with a carcass-type secondary reinforcement structure 11. The features of this secondary zone are advantageously similar to those previously described for the main zone 20. This zone 30 is at least partially disposed in the rim protector 70.

In the various examples illustrated in the Figures, the secondary anchoring zone takes the form of at least one cord batch 31 disposed near or immediately next to the secondary reinforcement structure portion 11.

The batch 31 may advantageously be formed of a single cord wound in a spiral, preferably from the smallest diameter to the largest. A batch may also be formed of plural concentric cords placed one inside another. In FIG. 1, the alignment is disposed substantially at zero degrees.

The arrangement 30 of cords 31 may extend substantially radially towards the sidewall and even along a portion thereof.

The number of windings, the radial spacing, and the radial position of the arrangement may vary infinitely. These features are defined according to the qualities desired, particularly in the lower zone and the zone of the sidewall of the tire, such as rigidity, wear-resistance, durability, etc. For example, the arrangement 30 of cords 31 extends substantially radially from the base of the reinforcement structure 11.

The cords are preferably metal. Various modifications advantageously provide cords of a textile composition, such as aramide, nylon, PET, PEN, or hybrid for example.

According to the invention, the use of cord alignments or windings 31 in cooperation with a rubber anchoring mix 60, preferably with a high modulus of elasticity, and preferably in cooperation also with an adjacent portion of reinforcement structure, contributes to the durability of the anchoring.

The secondary reinforcement structure 11 of the tire may take various forms, according to the particular case. Preferably, the structure portion extends from the rim protector to a portion of the sidewall located radially outwardly. According to a first advantageous example, the secondary reinforcement structure 11 extends from one sidewall of the tire to the other along a meridian path substantially adjacent to that of the first carcass-type reinforcement structure. In such a case, the two reinforcement structures of the tire are side-by-side along a portion of their path, then, at a certain radial position along the sidewall, the secondary structure 11 separates from the main structure 10' and extends towards the rim protector 70, where its end portion is anchored in the secondary anchoring zone 30.

Figure 4:
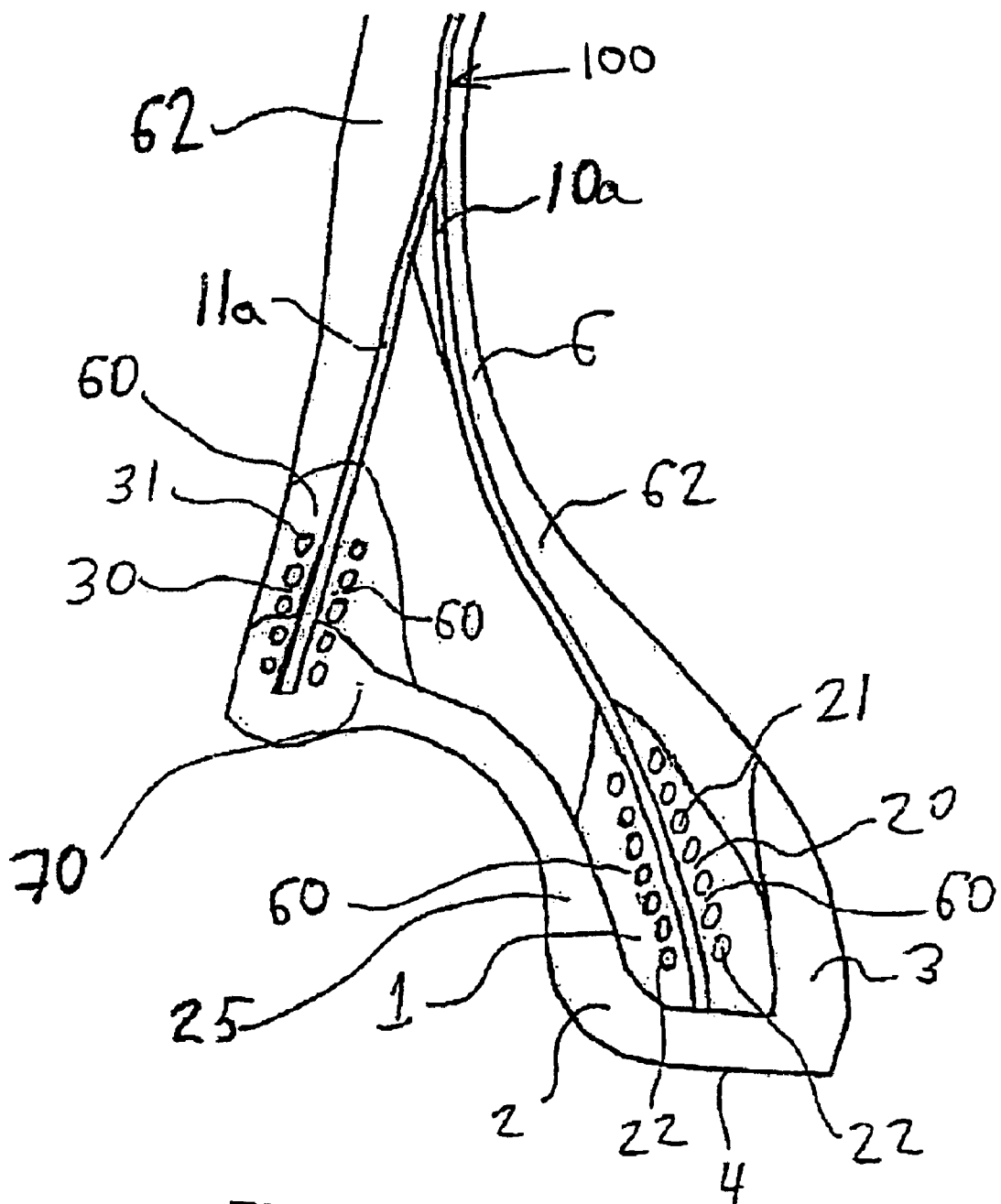
FIG. 4, a radial section showing a modification of the reinforcement structure.

According to another advantageous embodiment, shown in FIG. 4. the secondary reinforcement structure 11a consists of a plurality of carcass-type reinforcement structures of limited circumferential length, whose axial position separates from the two other adjacent integral circumferential portions 10a from the sidewall towards the rim protector. In this example, the circumference of the tire is subdivided into main zones where some portions 10a of a single reinforcement structure 100 are anchored in the bead, and other secondary zones where the structure 100 separates to form the secondary structure 11a, the structure 11a being then anchored in the rim protector. These main and secondary zones are preferably disposed alternatingly along the tire circumference. This example therefore gives rise to a circumferential alternation of zones where the structure now separates from the sidewall at a given point in order to form the main and secondary reinforcement structures 10a and 11a, respectively, and now the structure 10a extends towards the bead until it is anchored therein.

In the first of these two embodiments (FIGS. 1–3), the tire has two reinforcement structures, one anchored in the beads, the other anchored in the rim protector. In the second embodiment (FIG. 4), the structure 11a extends from the rim protector and joins the structure 10a at a certain radial position along the sidewall in order to form, starting from this point of imbrication, one single structure 100 extending preferably as far as a symmetrical point of disimbrication in the other sidewall. In this case, the secondary reinforcement structure 11a cooperates with the main reinforcement structure 10a.

In the embodiment shown in FIG. 2, the main anchoring zone 20 comprises a bead wire 80, about which a portion of the carcass-type reinforcement structure 10 is at least partially wound. This produces a turned-up portion 81, the whole preferably in a rubber anchoring mix 82 of known type.

Figure 3:
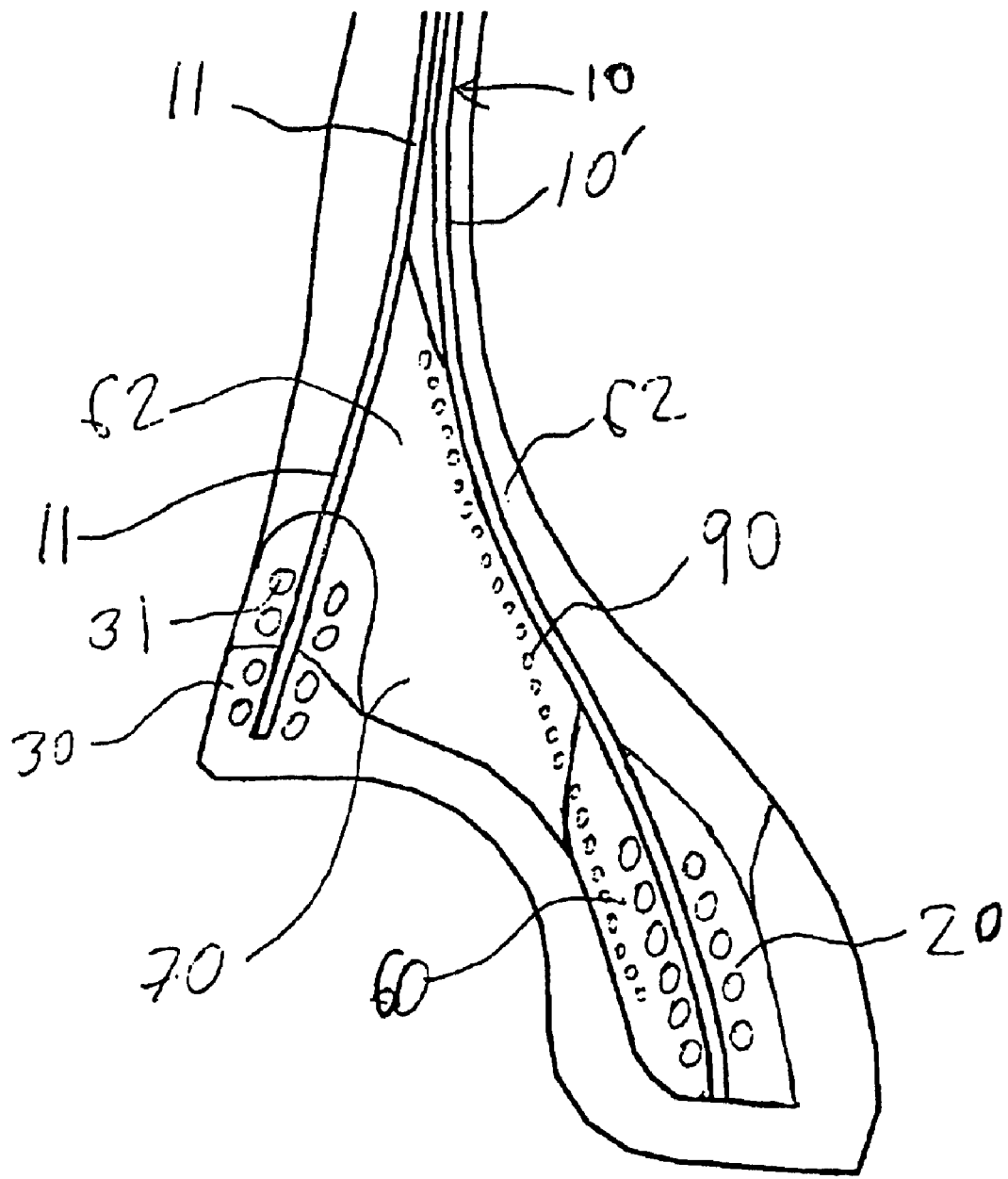
FIG. 3, is a radial section showing essentially a sidewall and a bead of a modification with respect to the embodiment of FIG. 1.

FIG. 3 shows a modification of the embodiment of FIG. 1, wherein a plurality of circumferential windings 90 extend between the bead of one part and the zone where the structures 10' and 11 converge. In a first radially inner portion, the windings are immersed in a rubber anchoring mix 60, whereas in a radially outer zone, the windings 90 are disposed in a sidewall mix 62, whose modulus of elasticity is advantageously lower than that of the anchoring mix 60.

What is claimed is:

1. A tire comprising at least one carcass-type reinforcement structure anchored on each side of the tire in a bead whose base is intended to be mounted on a rim seat, the at least one reinforcement structure forming a main reinforcement structure and a secondary reinforcement structure, each bead extending radially outwards by a sidewall, the sidewalls radially outwardly joining a tread, the main reinforcement structure extending from the bead to the sidewall, and a crown reinforcement, each of the beads further comprising a main anchoring zone for attaching the main reinforcement structure, the tire comprising in a radially outer position relative to the main anchoring zone a rim protector provided with a rubber projection extending axially outwardly relative to the sidewall and comprising at least one secondary anchoring zone for anchoring the secondary reinforcement structure, the secondary anchoring zone comprising a cord batch forming radially spaced circumferentially extending cord portions cooperating with an adjacent portion of the secondary reinforcement structure via a rubber anchoring mix, wherein the secondary reinforcement structure terminates at a location spaced from the main anchoring zone.

2. The tire of claim 1, wherein the secondary reinforcement structure extends from the rim protector up to a radially outer portion of the sidewall.

3. The tire of claim 1, wherein the at least one reinforcement structure comprises a plurality of reinforcement structures forming the main and secondary reinforcement structures, respectively, the secondary reinforcement structure extending from one sidewall of the tire to the other along a meridian path substantially adjacent to that of the main reinforcement structure.

4. The tire of claim 1, wherein the main anchoring zone comprises a cord batch including radially spaced circumferentially extending cord portions cooperating with the adjacent portion of the main reinforcement structure portion via a rubber anchoring mix.

5. The tire of claim 4 wherein there are two cord batches at each of the main and secondary anchoring zones, wherein one of the two batches is disposed adjacent one side of the respective main and secondary reinforcement structures, and the other batch is disposed adjacent an opposite side of such respective reinforcement structure.

6. The tire of claim 1, wherein the main anchoring zone comprises a bead wire about which a portion of the carcass-type reinforcement structure is at least partially wound.

7. The tire of claim 1 wherein the main and secondary reinforcement structures are integral parts of a single reinforcement structure, and are disposed alternatingly along the tire circumference.

8. The tire of claim 1 wherein the cord batch is embedded in the anchoring mix such that the cord portions of the cord batch are spaced by the anchoring mix from one another and from the secondary reinforcement structure.

9. The tire of claim 8 wherein the cord portions comprise respective turns of a spirally-wound cord.

10. The tire of claim 8 wherein the cord portions comprise respective concentrically arranged cord rings.

11. A tire comprising at least one carcass-type reinforcement structure anchored on each side of the tire in a bead whose base is intended to be mounted on a rim seat, the at least one reinforcement structure including a main reinforcement structure and a secondary reinforcement structure, each bead extending radially outwards by a sidewall, the sidewalls radially outwardly joining a tread, the main reinforcement structure extending from the bead to the sidewall, and a crown reinforcement, each of the beads further comprising a main anchoring zone for attaching the main reinforcement structure, the tire comprising in a radially outer position relative to the main anchoring zone a rim protector provided with a rubber projection extending axially outwardly relative to the sidewall and comprising at least one secondary anchoring zone for anchoring the secondary reinforcement structure, the secondary anchoring zone comprising a cord batch including radially spaced, circumferentially extending cord portions cooperating with an adjacent portion of the secondary reinforcement structure via a rubber anchoring mix, the cord batch being embedded in the rubber anchoring mix such that the cord portions of the cord batch are spaced by the anchoring mix from one another and from the secondary reinforcement structure.

12. The tire of claim 11 wherein the cord portions comprise respective turns of a spirally-wound cord.

13. The tire of claim 11 wherein the cord portions comprise respective concentrically arranged cord rings.

14. A tire comprising a carcass-type reinforcement structure anchored on each side of the tire in a bead whose base is intended to be mounted on a rim seat, each bead extending radially outwards by a sidewall, the sidewalls radially outwardly joining a tread, the carcass-type reinforcement structure extending from the bead to the sidewall and comprising first and second integrally formed reinforcement portions disposed alternatingly along the tire circumference, and a crown reinforcement, each of the beads further comprising a main anchoring zone for attaching the first reinforcement portions, the tire comprising in a radially outer position relative to the main anchoring zone a rim protector provided with a rubber projection extending axially outwardly relative to the sidewall and comprising at least one secondary anchoring zone comprising a cord batch which includes circumferentially extending radially spaced cord portions cooperating with the second reinforcement portions via a rubber anchoring mix.

* * * * *